US012658752B2

(12) United States Patent
Yanagisawa et al.

(10) Patent No.: US 12,658,752 B2
(45) Date of Patent: Jun. 16, 2026

(54) COIL, STATOR, AND MOTOR

(71) Applicant: ASTER CO., LTD., Yokote (JP)

(72) Inventors: Kyohei Yanagisawa, Yokote (JP); Yuta Furuya, Yokote (JP)

(73) Assignee: ASTER CO., LTD., Yokote (JP)

( * ) Notice: Subject to any disclaimer, the term of this patent is extended or adjusted under 35 U.S.C. 154(b) by 264 days.

(21) Appl. No.: 18/290,278

(22) PCT Filed: May 10, 2022

(86) PCT No.: PCT/JP2022/019822
§ 371 (c)(1),
(2) Date: Nov. 10, 2023

(87) PCT Pub. No.: WO2022/239775
PCT Pub. Date: Nov. 17, 2022

(65) Prior Publication Data
US 2024/0364163 A1 Oct. 31, 2024

(30) Foreign Application Priority Data
May 13, 2021 (JP) ................................. 2021-081485

(51) Int. Cl.
*H02K 3/04* (2006.01)
*H02K 3/02* (2006.01)
(52) U.S. Cl.
CPC ................. *H02K 3/04* (2013.01); *H02K 3/02* (2013.01)
(58) Field of Classification Search
CPC .................................... H02K 3/02; H02K 3/04
USPC ......................................................... 310/208
See application file for complete search history.

(56) References Cited

U.S. PATENT DOCUMENTS

| | | | |
|---|---|---|---|
| 8,841,811 B2* | 9/2014 | Bradfield | H02K 3/24 310/201 |
| 9,124,159 B2 | 9/2015 | Yamada et al. | |
| 9,413,200 B2 | 8/2016 | Horisaka et al. | |
| 11,177,710 B2 | 11/2021 | Ziems et al. | |
| 12,057,265 B2 | 8/2024 | Hongo | |
| 2005/0035673 A1* | 2/2005 | Lafontaine | H02K 1/2791 310/58 |
| 2005/0046299 A1* | 3/2005 | Brown | H02K 3/493 29/606 |
| 2009/0261686 A1* | 10/2009 | Kouda | H02K 3/12 310/207 |

(Continued)

FOREIGN PATENT DOCUMENTS

| | | |
|---|---|---|
| CN | 106767335 A | 5/2017 |
| JP | 2004-153874 A | 5/2004 |

(Continued)

OTHER PUBLICATIONS

Supplementary European Search Report dated Oct. 17, 2024, directed to EP Application No. 22807474.6; 5 pages.

*Primary Examiner* — Rashad H Johnson
(74) *Attorney, Agent, or Firm* — Morrison & Foerster LLP

(57) ABSTRACT
Provided are a coil, a stator, and a motor that can suppress generation of eddy current in the coil and reduce Joule loss. A coil is formed by connecting a plurality of one-turn regions each including a turn of a conductor to have a helical structure. The conductor is formed by connecting a first member to a second member in a longitudinal direction, and the plurality of one-turn regions include at least in a part thereof the first member.

9 Claims, 10 Drawing Sheets

(56) References Cited

U.S. PATENT DOCUMENTS

| | | |
|---|---|---|
| 2012/0313492 A1 | 12/2012 | Yamada et al. |
| 2015/0244233 A1* | 8/2015 | Hattori ..................... H02K 3/42 |
| | | 310/201 |
| 2015/0328502 A1* | 11/2015 | Retkowski ............... H01Q 1/36 |
| | | 29/605 |
| 2016/0105061 A1 | 4/2016 | Horisaka et al. |
| 2016/0156238 A1* | 6/2016 | Tsuiki ..................... H02K 3/38 |
| | | 310/71 |
| 2018/0226852 A1* | 8/2018 | Kitamura ................. H02K 3/12 |
| 2018/0323672 A1* | 11/2018 | Juris ........................ H02K 3/18 |
| 2019/0229572 A1 | 7/2019 | Ziems et al. |
| 2021/0083541 A1* | 3/2021 | Tsukamoto ............. H02K 9/22 |
| 2021/0272752 A1 | 9/2021 | Hongo |
| 2022/0224180 A1 | 7/2022 | Hongo |
| 2024/0355541 A1 | 10/2024 | Hongo |

FOREIGN PATENT DOCUMENTS

| | | |
|---|---|---|
| JP | 3747318 B2 | 12/2005 |
| JP | 2010-183741 A | 8/2010 |
| JP | 2013-5487 A | 1/2013 |
| JP | 5708880 B1 | 3/2015 |
| JP | 2019-515636 A | 6/2019 |
| JP | 2020-5370 A | 1/2020 |
| JP | 2020-174417 A | 10/2020 |
| JP | 2020-184832 A | 11/2020 |
| JP | 6795267 B1 | 11/2020 |
| WO | 2019/229972 A1 | 12/2019 |
| WO | 2020017394 A1 | 1/2020 |

* cited by examiner

10

C    103    101    CR    A    102

101

SC

104

104

102    103    102

A 106    104

CR(CR6)
CR(CR5)
CR(CR4)
CR(CR3)
CR(CR2)
CR(CR1)

104    105

106

103

103

105

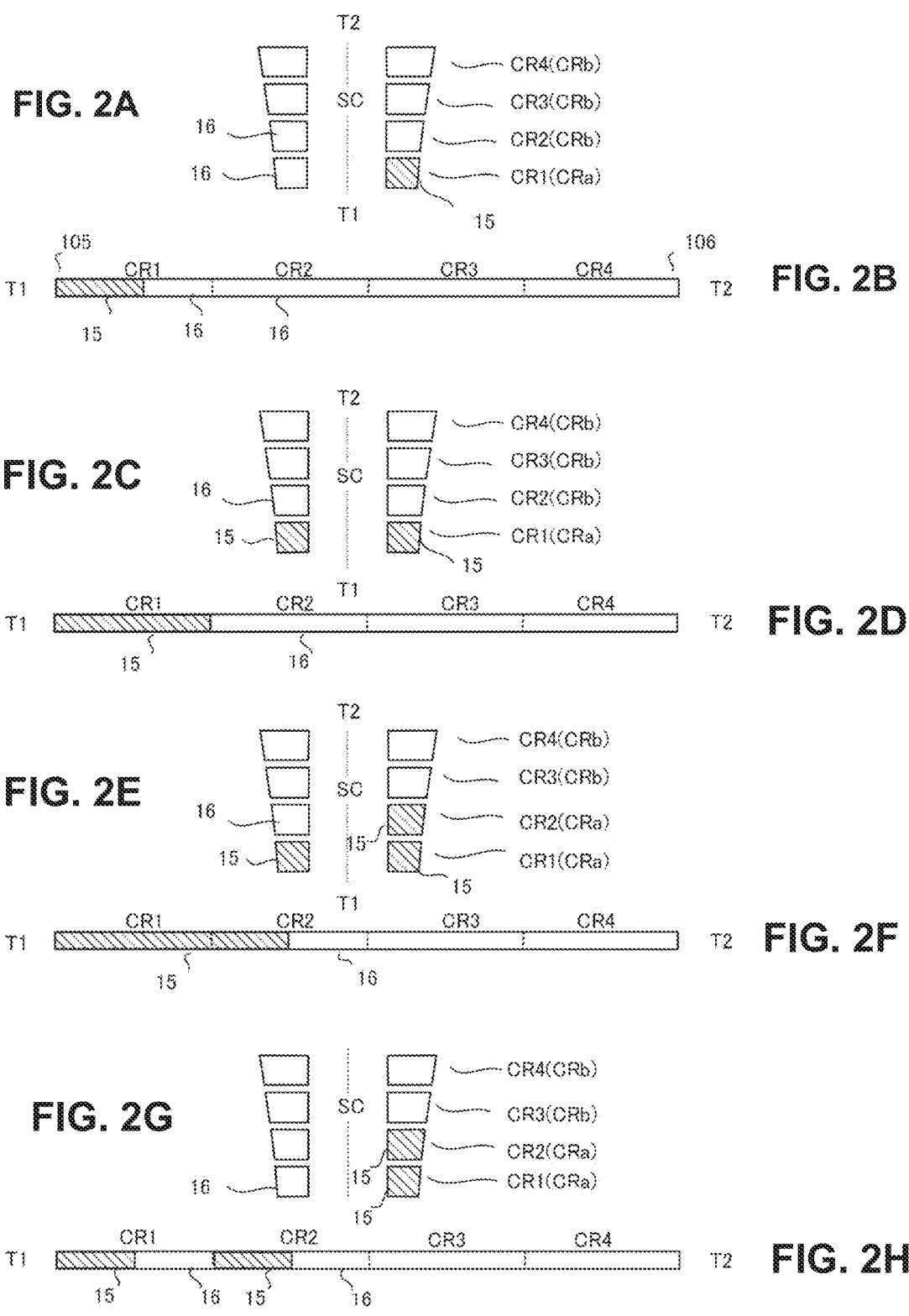

FIG. 3A
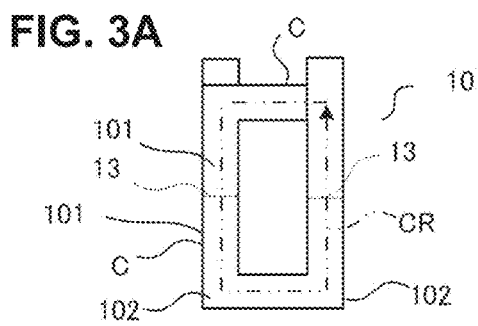
FIG. 3B
FIG. 3C
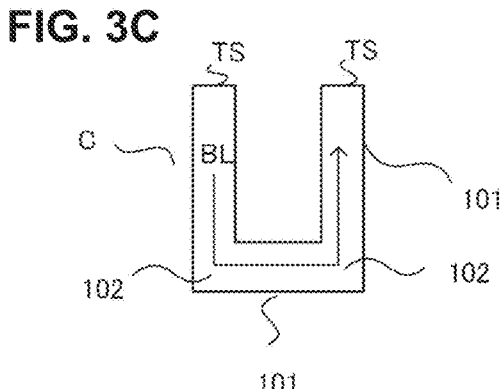
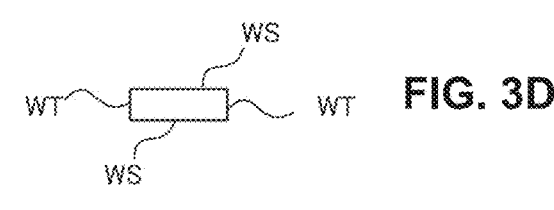
FIG. 3D
FIG. 3E

JOULE LOSS DENSITY
CONTOUR PLOT : W/m^3

MAXIMUM: 1.6048e+08
MINIMUM: 0.0000e+00

JOULE LOSS PERCENTAGES IN COIL [W]

※  Layer 1 UPSTREAM IN ROTATING DIRECTION
※  Layer 1 DOWNSTREAM IN ROTATING DIRECTION
※  Layer 2 UPSTREAM IN ROTATING DIRECTION
※  Layer 2 DOWNSTREAM IN ROTATING DIRECTION
※  Layer 3 UPSTREAM IN ROTATING DIRECTION
※  Layer 3 DOWNSTREAM IN ROTATING DIRECTION
※  Layer 4 UPSTREAM IN ROTATING DIRECTION
※  Layer 4 DOWNSTREAM IN ROTATING DIRECTION

COIL, STATOR, AND MOTOR

CROSS-REFERENCE TO RELATED APPLICATIONS

This application is a U.S. national stage application under 35 U.S.C. § 371 of International Application No. PCT/JP2022/019822, filed May 10, 2022, which claims the priority of JP Application No. 2021-081485, filed May 13, 2021. The entire contents of each priority application is incorporated herein by reference.

FIELD OF THE DISCLOSURE

The present disclosure relates to a coil, a stator, and a motor.

BACKGROUND OF THE DISCLOSURE

In an electric component using an electric coil, such as a motor, high current needs to be supplied particularly to achieve high output, but the accompanying heat generation is significant, which causes a problem of energy loss (Joule loss).

The loss caused by the heat of the motor mainly includes power loss generated from winding resistance (R) of the coil and flowing current (I) ($P=I^2 \times R$, also referred to as copper loss), power loss caused by the magnetic field and the changes thereof (loss due to hysteresis and loss due to eddy current generated in the magnetic body along with changes in the magnetic field, also referred to as iron loss), and loss caused by friction, air resistance, and the like in the motor (also referred to as machine loss).

Conventionally, various studies have been conducted from the viewpoint of the external shape of the coil (for example, refer to PTL 1) and the viewpoint of the control (for example, refer to PTL 2) in order to reduce the copper loss and the iron loss.

Also, in particular, when attention is focused on the coil (and component materials therefor), it can be concluded that the copper loss and loss particularly due to the eddy current (alternating-current loss caused by the eddy current due to the current flowing in the coil and the interlinkage magnetic flux to the coil), which is among the iron loss components, are major causes for the Joule loss. At present, as the component materials for the coil, a copper (Cu) member, an aluminum (Al) member, and the like are used in general.

PTL 1: Japanese Patent Application Laid-Open No. 2020-5370

PTL 2: Japanese Patent No. 6795267

SUMMARY OF THE DISCLOSURE

However, a coil (hereinbelow, a copper-made coil) made mainly of a copper member (copper, a copper alloy, or the like) and a coil (hereinbelow, an aluminum-made coil) made mainly of an aluminum (Al) member (aluminum, an aluminum alloy, or the like) each have advantages and disadvantages.

Specifically, the copper-made coil has lower resistance and lower copper loss than the aluminum-made coil but is heavy in weight. On the other hand, the aluminum-made coil is lighter, cheaper, and lower in iron loss than the copper-made coil, but has a characteristic of high copper loss.

For these reasons, there is a limit to loss reduction and efficiency improvement achieved in the motor by performing studies on coil materials.

In consideration of such problems, an object of the present disclosure is to provide a coil, a stator, and a motor that can suppress generation of eddy current in the coil and reduce Joule loss.

The present disclosure relates to a coil formed by connecting a plurality of one-turn regions each including a turn of a conductor to have a helical structure, wherein the conductor is formed by connecting a first member to a second member in a longitudinal direction, and the plurality of one-turn regions include at least in a part thereof the first member.

Also, the present disclosure relates to a coil configured to form a helical structure using a conductor and attached to a stator of a motor, the coil including a plurality of one-turn regions stacked in a direction of a helical axis, wherein out of the one-turn regions, at least a part of a one-turn region near a rotor (hereinbelow referred to as "a near side one-turn region") is constituted of a first member, and at least a part of a one-turn region far from the rotor (hereinbelow referred to as "a far side one-turn region") is constituted of a second member.

Also, the present disclosure relates to a stator to which the above-described coil is attached.

Also, the present disclosure relates to a motor including the above-described coil.

Also, the present disclosure relates to a motor including the above-described coil. The motor is characterized in that, compared with a case where a motor including another coil in which all of one-turn regions are constituted of the second member and which has an equal shape of the coil is assumed to be produced and operated, loss is lower in a high rotation number range than the motor, whereas loss is higher in a low rotation number range than the motor.

According to the present disclosure, it is possible to provide a coil, a stator, and a motor that can suppress generation of eddy current in the coil and reduce Joule loss.

BRIEF DESCRIPTION OF THE FIGURES

FIGS. 1A-IC include schematic views of a coil according to some embodiments, in which FIG. 1A is a front view thereof, FIG. 1B is a side view thereof, and FIG. 1C is a side view thereof.

FIGS. 2A-2H include schematic views illustrating the coil according to some embodiments, in which FIG. 2A is a cross-sectional view thereof, FIG. 2B is a plan view thereof, FIG. 2C is a cross-sectional view thereof, FIG. 2D is a plan view thereof, FIG. 2E is a cross-sectional view thereof, FIG. 2F is a plan view thereof, FIG. 2G is a cross-sectional view thereof, and FIG. 2H is a plan view thereof.

FIGS. 3A-3E include schematic views illustrating the coil according to some embodiments, in which FIG. 3A is a plan view thereof, FIG. 3B is a plan view thereof, FIG. 3C is a plan view thereof, FIG. 3D is a cross-sectional view thereof, and FIG. 3E is a cross-sectional view thereof.

FIGS. 4A-4D include schematic views according to some embodiments, in which FIG. 4A is a plan view of a motor, FIG. 4B is a lateral cross-sectional view of the motor, FIG. 4C is a cross-sectional view of a motor, and FIG. 4D is a front view of a motor.

FIGS. 8A-8B include views illustrating Joule loss generated in the coil, in which FIG. 8A is a schematic plan view illustrating the coil that is spread out, FIGS. 8B and 8C are each a schematic view describing a relationship between Joule loss generated in a copper-made coil and a rotation number of a motor, FIGS. 8D and 8E are each a schematic view describing a relationship between Joule loss generated in an aluminum-made coil and a rotation number of a motor, and FIGS. 8F and 8G are each a schematic view describing a relationship between Joule loss generated in the coil of some embodiments and a rotation number of a motor.

FIGS. 10A-10B include schematic views according to some embodiments, in which FIG. 10A is a lateral cross-sectional view of a motor, and FIG. 10B is a cross-sectional view thereof.

DETAILED DESCRIPTION OF THE DISCLOSURE

Hereinbelow, embodiments of the present disclosure will be described in detail with reference to the drawings. Note that, in each of the present drawings and following drawings, some components may be appropriately omitted to simplify the drawings. Also, in each of the present drawings and following drawings, the size, shape, thickness, and the like of each member are exaggerated as needed.

Figures 1A, 1B, 1C:
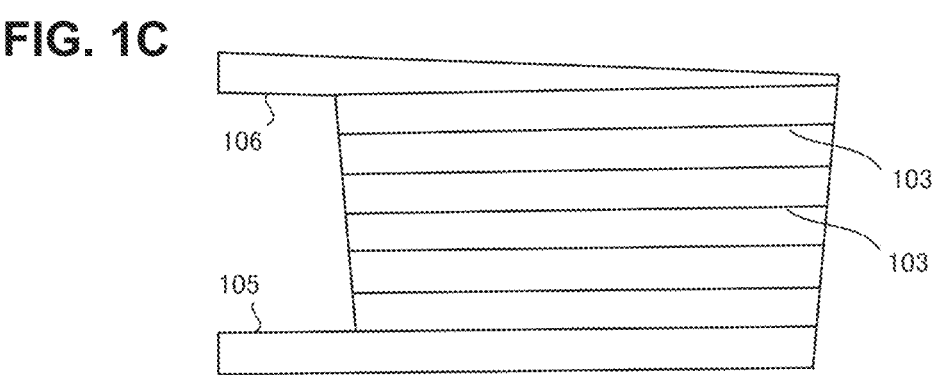

FIGS. 1A-1C include schematic views of a coil 10 according to some embodiments of the present disclosure. Here, FIG. 1A is a front view of the coil 10 having a helical shape as viewed in a direction of an axis (helical axis) SC of the helix, FIG. 1B is a side view as viewed in a direction of a shorter side 104 (for example, the left side of FIG. 1A), and FIG. 1C is a side view as viewed in a direction of a longer side 103 (for example, the lower side of FIG. 1A). Note that, in each of the present drawings and following drawings, some components are appropriately omitted to simplify the drawings. Also, in each of the present drawings and following drawings, the size, shape, thickness, and the like of each member are exaggerated as needed.

As illustrated in FIGS. 1A-1C, the coil 10 of some embodiments is obtained by constituting a helical structure body by a long strip-like flat conductor, for example. The entire external shape is, for example, an approximately rectangular shape having the shorter side 104 and the longer side 103 in a plan view (FIG. 1A) and is an approximately quadrangular pyramidal trapezoidal shape having an approximately trapezoidal shape in a side view (FIGS. 1B and 1C). The shorter side 104 and the longer side 103 each includes a straight portion 101. Furthermore, an approximately orthogonal corner portion 102a is formed at a part between the straight portions 101. Note that the shape of the coil 10 is illustrative only and is not limited to the example in FIGS. 1A-1C.

The coil 10 has a plurality of one-turn regions CR stacked in the direction of the helical axis SC. Here, the "one-turn region" used in some embodiments refers to each turn of the helical structure body, that is, a region for one turn (one-turn region), illustrated by the dotted arrow in FIG. 1A. Note that although the plurality of one-turn regions CR are illustrated to be separated from each other and are described by using the number of stacked layers in some cases for convenience of description, the respective one-turn regions CR constituting one coil 10 are continuously provided from a starting end 105 to a terminal end 106 of the helical structure body illustrated in FIG. 1B since the coil 10 has a helical structure. Note that although the lower side in FIG. 1B is referred to as the starting end 105 while the upper side is referred to as the terminal end 106 for convenience of description, these names may be replaced with each other.

The coil 10 is a so-called concentrated winding coil in which the plurality of one-turn regions CR are overlapped in the direction of the helical axis SC (up-down direction in FIGS. 1B and 1C) so that the centers of the one-turn regions CR substantially correspond to the helical axis SC to form a helix.

The coil 10 is also, for example, an edgewise coil, which forms the helical structure body with a strip-like flat conductor having straight parts (straight portions 101) as illustrated in FIG. 1A (in a complete state, the flat conductor is in a wound structure).

That is, each of the one-turn regions CR has a structure in which one (one piece of) flat conductor makes one turn (is constituted by one turn), and the plurality of one-turn regions CR (for example, six layers in FIG. 1B) are stacked in the direction of the helical axis SC. For example, in FIG. 1B, from the side provided with the starting end 105 (the side on which the shorter side 104 is the shorter), a one-turn region in the first layer (first-layer one-turn region) CR1, a one-turn region in the second layer (second-layer one-turn region) CR2, a one-turn region in the third layer (third-layer one-turn region) CR3, a one-turn region in the fourth layer (fourth-layer one-turn region) CR4, a one-turn region in the fifth layer (fifth-layer one-turn region) CR5, and a one-turn region in the sixth layer (sixth-layer one-turn region) CR6 are constituted of a single continuous long strip-like conductor (one flat conductor).

Note that although the lowermost layer is referred to as a first layer in FIGS. 1A-1C, the order of stacking (laminating) the one-turn regions CR is not limited to that in this example, and the uppermost layer may be referred to as a first layer. Also, the number of the one-turn regions CR is illustrative only, and any number is freely selected (the same applies to the following description).

FIGS. 2A-2H includes views describing the details of the coil 10 of some embodiments, and FIGS. 2A, 2C, 2E, and 2G are cross-sectional views corresponding to the cross-section along line A-A in FIG. 1A. Note that a single coil 10 in FIGS. 2A-2H includes, for example, four layers of one-turn regions CR, and a description will be given of a case where, similarly to FIG. 1B, the first-layer one-turn region CR1, the second-layer one-turn region CR2, . . . are provided from the side on which the shorter side 104 is the shorter (the lower layer in FIGS. 2A-2H) although illustration of the starting end 105 and the terminal end 106 is omitted in FIGS. 2A, 2C, 2E, and 2G. In addition, FIGS. 2B, 2D, 2F, and 2H are planar schematic views, assuming that the coils 10 in FIGS. 2A, 2C, 2E, and 2G are spread out.

The coil 10 of some embodiments is a helical structure body formed by continuously connecting a plurality of one-turn regions CR each including one turn of a conductor, and the conductor is formed by connecting a first member 15 (hatched portion in FIGS. 2A-2H) to a second member 16. The plurality of one-turn regions CR include at least the first member 15 in a part thereof. Preferably, the plurality of one-turn regions CR include a first one-turn region CRa and a second one-turn region CRb which includes the second member 16. More preferably, the second one-turn region CRb is constituted of only the second member 16. The plurality of one-turn regions CR are configured to be stacked in the direction of the helical axis SC. The first one-turn region CRa is located on one end (end portion T1) side in the direction of the helical axis SC. The second one-turn region CRb is located nearer the other end (end portion T2) side in the direction of the helical axis SC than the first one-turn region CRa.

In a case where the first one-turn region CRa includes the first member 15 in a part thereof, the first member 15 is changed to the second member 16 in the middle of the turn (a connection portion between the first member 15 and the second member 16 exists in the middle of the turn). Preferably, the second one-turn region CRb is constituted of only the second member 16.

A specific description will be given below. Referring to FIGS. 2A and 2B, the coil 10 of some embodiments is constituted of a helical structure body of a continuous conductor (here, one flat conductor), and the conductor is constituted of a plurality of members (the first member 15 and the second member 16). Specifically, in the coil 10, at least a part of one or a plurality of layers of one-turn regions CR located on one side of the helical axis SC provided with the end portion T1 is constituted of the first member 15 while one or a plurality of layers of one-turn regions CR located on the other side in the direction of the helical axis SC provided with the end portion T2 are constituted of the second member 16 (do not include the first member 15). More preferably, in the coil 10, at least a part of one or a plurality of layers of one-turn regions CR located on the side of the helical axis SC provided with the end portion T1 is constituted of the first member 15 while one or a plurality of layers of one-turn regions CR located on the side in the direction of the helical axis SC provided with the end portion T2 are constituted of only the second member 16 (do not include the first member 15).

The first member 15 is a conductor (metal) having a higher resistance than that of the second member 16. As a specific example, the first member 15 is a metal member composed primarily of aluminum (Al), and the second member is a metal member composed primarily of copper.

Here, the "metal composed primarily of aluminum" refers to a metal containing pure aluminum or an aluminum alloy at a proportion of 50% or more of the total. In a case where the metal contains a different component from the pure aluminum or the aluminum alloy, the type and number of the different components are freely selected. Alternatively, the metal may be pure aluminum or a metal in which the content of the aluminum alloy is 100% (or approximately 100%). Hereinbelow, in the present specification, a first metal constituting the first member 15 is referred to simply as "aluminum (Al)" or "an aluminum member" in some cases, which means "a metal composed primarily of aluminum".

Also, the "metal composed primarily of copper" refers to a metal containing pure copper or a copper alloy at a proportion of 50% or more of the total. In a case where the metal contains a different component from the pure copper or the copper alloy, the type and number of the different components are freely selected. Alternatively, the metal may be pure copper or a metal in which the content of the copper alloy is 100% (or approximately 100%). Hereinbelow, in the present specification, a second metal constituting the second member 16 is referred to simply as "copper (Cu)" or "a copper member" in some cases, which means "a metal composed primarily of copper".

Hereinbelow, an example will be described further in detail in which at least a part of one or a plurality of layers of one-turn regions CR located on the side of the helical axis SC provided with the end portion T1 is constituted of the first member 15 while one or a plurality of layers of one-turn regions CR located on the side in the direction of the helical axis SC provided with the end portion T2 are constituted of the second member 16 (do not include the first member 15).

FIGS. 2A and 2B illustrate an example in which the first-layer one-turn region CR1 located on one side of the helical axis SC provided with the end portion T1 is constituted of a combination of the first member 15 and the second member 16. That is, at least a part of the first-layer one-turn region CR1 located on the side of the helical axis SC provided with the end portion T1 (the right side in FIG. 2A, and the left side nearer to the starting end 105 in FIG. 2B) is constituted of the first member 15, the other part of the same first-layer one-turn region CR1 (the left side in FIG. 2A) is constituted of the second member 16, and the one-turn regions CR2 to CR4 on the second to fourth layers are constituted of only the second member 16. In this case, the first-layer one-turn region CR1 is the first one-turn region CRa, and the second-layer one-turn region CR2 to fourth-layer one-turn region CR4 are the second one-turn region CRb.

FIG. 2B is a plan view, assuming that the coil 10 in FIG. 2A is spread out. As described above, the coil 10 is constituted by winding one continuous conductor (here, one flat conductor) one turn to form the one-turn region CR and connecting multiple of (four in this case) the one-turn regions CR. In the first-layer one-turn region CR1, for example, a half turn from, for example, the starting end 105, is constituted of the first member 15, and the rest of the first-layer one-turn region CR1 connected to the half turn is constituted of the second member 16. The one-turn regions CR (CR2 to CR4) in the second to fourth layers connected to the first-layer one-turn region CR1 are constituted of only the second member 16.

FIGS. 2C and 2D illustrate an example in which the entirety of the first-layer one-turn region CR1 located on the side of the helical axis SC provided with the end portion T1 is constituted of the first member 15, and the one-turn regions CR (CR2 to CR4) in the second to fourth layers connected to the first-layer one-turn region CR1 are constituted of the second member 16. In this case as well, the first-layer one-turn region CR1 is the first one-turn region CRa, and the second-layer one-turn region CR2 to the fourth-layer one-turn region CR4 are the second one-turn region CRb.

In this case, as illustrated in FIG. 2D, the entire turn of the first-layer one-turn region CR1 starting from the starting end 105 includes the first member 15, and the second-layer one-turn region CR2 connected to the first-layer one-turn region CR1 and the subsequent part are constituted of only the second member 16.

FIGS. 2E and 2F illustrate an example in which the entirety of the first-layer one-turn region CR1 located on the side of the helical axis SC provided with the end portion T1 is constituted of the first member 15, a part of the second-layer one-turn region CR2 connected to the first-layer one-turn region CR1 is constituted of a combination of the first member 15 and the second member 16, and the rest is constituted of only the second member 16. That is, the entire turn of the first-layer one-turn region CR1 located on the side of the helical axis SC provided with the end portion T1 and at least a part of the second-layer one-turn region CR2 connected to the first-layer one-turn region CR1 (the right side in FIG. 2E, that is, for example, a half turn on the side nearer to the starting end 105) are constituted of the first member 15, the other part of the same second-layer one-turn region CR2 (the left side in FIG. 2E, that is, for example, the other half turn) is constituted of the second member 16, and the one-turn regions CR (CR3 and CR4) in the third to fourth layers are constituted of only the second member 16. In this case, the first-layer one-turn region CR1 and the second-layer one-turn region CR2 are the first one-turn region CRa, and the third-layer one-turn region CR3 to the fourth-layer one-turn region CR4 are the second one-turn region CRb.

In this case, as illustrated in FIG. 2F, the part from the starting end 105 to, for example, the first half of the second-layer one-turn region CR2 are constituted of the first member 15, the second half of the second-layer one-turn region CR2 connected to the first half is constituted of the second member 16, and the one-turn regions CR (CR3 to CR4) in the third to fourth layers connected to the second half are constituted of only the second member 16.

FIGS. 2G and 2H illustrate an example in which the first-layer one-turn region CR1 and the second-layer one-turn region CR2 are each constituted of a combination of the first member 15 and the second member 16, and the rest is constituted of only the second member 16. That is, at least a part (the right side in FIG. 2G, that is, for example, a half turn on the side nearer to the starting end 105) of the first-layer one-turn region CR1 located on the side of the helical axis SC provided with the end portion T1 includes the first member 15, and the other part (the left side in FIG. 2G, that is, for example, the other half turn) of the same first-layer one-turn region CR1 includes the second member 16. Also, at least a part of the second-layer one-turn region CR2 connected to the first-layer one-turn region CR1 (the right side in FIG. 2G, that is, for example, a half turn) is constituted of the first member 15, and the other part of the same second-layer one-turn region CR2 (the left side in FIG. 2G, that is, for example, the other half turn) is constituted of the second member 16. Furthermore, the one-turn regions CR (CR3 to CR4) in the third to fourth layers connected to the second-layer one-turn region CR2 are constituted of only the second member 16. In this case, the first-layer one-turn region CR1 and the second-layer one-turn region CR2 are the first one-turn region CRa, and the third-layer one-turn region CR3 to the fourth-layer one-turn region CR4 are the second one-turn region CRb.

In this case, as illustrated in FIG. 2H, from the starting end 105 to the second-layer one-turn region CR2, the first member 15 and the second member 16 are arranged alternately per half turn, and continuously from the second-layer one-turn region CR2, only the second member 16 is arranged in the one-turn regions CR (CR3 and CR4) in the third to fourth layers.

Note that although a case where the first member 15 is provided at a half turn portion of the one-turn region CR in the first one-turn region CRa in FIGS. 2A, 2E, and 2G has been illustrated, the first member 15 may be provided at the other half turn portion corresponding to the left side part in each of the figures. Also, although a configuration in which the first member 15 is provided as long as the half turn of the one-turn region CR is illustrated as an example of the first one-turn region CRa here, the range of the first member 15 in the first one-turn region CRa may be longer or shorter than the half turn. Although a case where the first one-turn region CRa ranges to the second-layer one-turn region CR2 has been illustrated, a configuration in which the third-layer one-turn region CR3 and the subsequent region include the first member 15 (that is, which are the first one-turn region CRa) may be available, and all of the one-turn regions CR in the coil 10 may be the first one-turn region CRa.

Next, referring to FIGS. 3A-3E, an example of a method for manufacturing the coil 10 of some embodiments will be described. FIGS. 3A-3E includes schematic views describing component members of the coil 10, in which FIG. 3A is a plan view of the coil 10 in a complete state as viewed in the direction of the helical axis SC (plan view corresponding to FIG. 1A), FIGS. 3B and 3C are plan views illustrating an example of a flat conductor piece C constituting the coil 10, and FIGS. 3D and 3E are enlarged cross-sectional views taken along line B-B in FIG. 3B.

For example, the coil 10 forms a helical structure body by connecting a plurality of strip-like flat conductor pieces (coil pieces) C that can form a helical structure when continuously joined. More specifically, for example, in the coil 10 a helical structure body is formed by connecting a plurality of strip-like flat conductor pieces C each including the straight portion 101 with each other along a strip longitudinal direction (helical traveling direction) BL at the straight portions 101 thereof, making end faces TS of the coil pieces C in the helical traveling direction abut on each other to press (pressure-weld, for example, cold-pressure-weld) the end faces TS, and continuously joining the flat conductor pieces C to have a desired number of times of winding. That is, a single one-turn region CR is constituted of one flat conductor piece C or the connected flat conductor pieces C. Each of the one-turn regions CR has approximately orthogonal corner portions and has a (approximately) rectangular shape on the outer peripheral side and the inner peripheral side in a plan view (FIG. 3A and FIG. 1A) as viewed in the direction of the helical axis SC of the coil 10. Hereinbelow, the flat conductor piece C may sometimes be referred to as the coil piece C.

As illustrated in FIG. 3B, the flat conductor piece (coil piece) C of some embodiments is, for example, a conductor in which a cross-section (cross-section along the line B-B) when cut in a direction (strip transverse direction BS) perpendicular (orthogonal) to the straight portion in the strip longitudinal direction BL (traveling direction of the helical structure) has a rectangular shape as illustrated in FIG. 3D or a rectangular shape having rounded corners as illustrated in FIG. 3E. That is, the coil piece C has two opposed first surfaces (here, wider surfaces) WS and two opposed second surfaces (here, narrower surfaces) WT and is a strip-like member elongated in a predetermined direction. In the following description, as an example of the coil piece C, a case where the cross-section orthogonal to the strip longitudinal direction has a (approximately) rectangular shape as illustrated in FIG. 3D will be described.

The plurality of coil pieces C are connected at the end faces thereof, for example, with the surfaces being in an aligned state. Here, the "surfaces being in aligned state" refers to, in a case where the cross-sectional shape of each coil piece C is not a longitudinally and transversely symmetrical shape such as a square, a round wire, or the like (in a case where the cross-sectional shape is an approximately rectangular shape as in FIG. 3D), "a state where the shapes of the two coil pieces C are aligned so that the corresponding surfaces face in the same direction (for example, so that the corresponding surfaces face upward)". Specifically, in a case where each of the two coil pieces has the first surface WS which is wider and the second surface WT which is narrower as illustrated in FIG. 3D, the two coil pieces C are aligned and connected so that the wider surfaces (first surfaces WS) face upward. In this case, the lengths (the sizes and the shapes of the end faces) of the two coil pieces C in the wider direction may differ from each other.

Note that although the first surface WS is the wider surface while the second surface WS is the narrower surface for convenience of description, the first surface WS may be the narrower surface while the second surface WT may be the wider surface, and the cross-sectional shape may be an approximately square shape in a cross-sectional view in which the first surface WS and the second surface WT are equivalent in length. Also, the aforementioned connection with the "surface being in the aligned state" is illustrative only, and the present disclosure is not limited to this. For example, the two coil pieces C may be connected so that the first surface of one coil piece C which is wider and the second surface WT of the other coil piece C which is narrower may face in the same direction (for example, so that they may face upward without the surfaces being aligned).

Each of the coil pieces C is obtained, for example, by punching a plate-like metal (for example, a metal having a thickness of about 0.1 mm to 5 mm) into a desired shape and has at least one straight portion 101 and at least one corner portion 102. Here, the corner portion 102 is a portion that is bent so as to change the extending direction of the strip longitudinal direction BL. At least one (preferably, all) of the corner portions 102 is preferably a corner portion having a non-curved (for example, approximately orthogonal) shape. In this example, the corner portion 102 is an approximately square shaped region as illustrated by hatching in FIG. 1A. Also, the end face TS of the coil piece C of some embodiments is located at the straight portion 101 of the coil piece C except the corner portion 102. In the following example, a case where one coil piece C has a (approximately) U shape having two approximately orthogonal corner portions 102 (corner portions) as illustrated in FIG. 3C. However, the shape of the coil piece C is not limited to this and may be, for example, an approximately L shape or an approximately C shape. Also, the plurality of coil pieces C may all have the same shape or may be a combination of different shapes. Further, in a case where the coil pieces C having different shapes are combined, a coil piece C having a linear shape (I shape) provided with no corner portion 102 may be included.

In such a plurality of coil pieces C, when the end faces TS in the helical traveling direction abut on each other and are pressure-welded (for example, cold-pressure-welded), in the coil 10, a coil piece welded portion 13 as a result of pressure welding is formed in the straight portion 101 of the one-turn region CR except the corner portion 102 as illustrated in FIGS. 3A and 1A. Also, assuming that the coil 10 is spread out, the coil 10 is one continuous long strip-like flat conductor formed by connection of the plurality of coil pieces C as illustrated in FIGS. 2A-2H, and a plurality of one-turn regions (one-turn regions CR) are formed.

In this manner, in some embodiments, since the plurality of coil pieces C are pressed to form a helical structure, one coil 10 can be constituted by a plurality of members (the first member 15 and the second member 16). More specifically, the coil 10 in a complete form is configured to have a helical structure body of a long strip-like flat conductor, and the first member 15 and the second member 16 can be mixed in the elongated direction (longitudinal direction). Furthermore, the position and the length thereof (arranging region in the longitudinal direction) can freely be selected. With this configuration, for example, a half turn portion of a certain one-turn region CR can include the first member 15 while the other half turn portion can include the second member 16. As a result, the coil 10 in which only a desired region includes the first member 15 as illustrated in FIGS. 2A-2H can be obtained.

Note that, in a case where the plurality of coil pieces C each having a predetermined shape (for example, an approximately U shape) as illustrated in FIGS. 3A-3E are pressure-welded to form a helical structure body, (unlike a helical structure body obtained by winding a linear conductor), the helical structure body cannot actually be spread out in a linear shape as illustrated in FIGS. 2A-2H. However, FIGS. 2A-2H schematically illustrates the linear shape as a description of the arranging state of the first member 15 and/or the second member 16 constituting each of the one-turn regions CR from the starting end 105 to the terminal end 106.

In addition, since the coil 10 can be formed by connecting the plurality of coil pieces C each punched into a desired shape (for example, a U shape having an approximately orthogonal corner portion 102 (corner portion)), the shape (particularly, the shape on the inner peripheral side) of the plan view (FIG. 3A) of the coil 10 can be made an approximately rectangular shape. Accordingly, for example, in a case where the coil 10 is attached to a stator of a motor, the space factor of the coil 10 can be increased. As a result, the motor using the coil 10 can achieve low resistance and high efficiency.

The coil 10 of some embodiments is attached to the stator of a motor, for example. In this case, in the plan view (FIG. 3A) of the coil 10, a tooth of the stator (core) is inserted into the internal space of the one-turn region CR. In the coil 10, the first member 15 is arranged near one end portion (the end portion T1 in the above description) of the helical axis SC. In a case where the coil 10 is attached to the stator as a component of the motor, the arranging region of the first member 15 is determined on the basis of the positional relationship with the rotor. This will be described below.

Figures 4A, 4B, 4C, 4D:
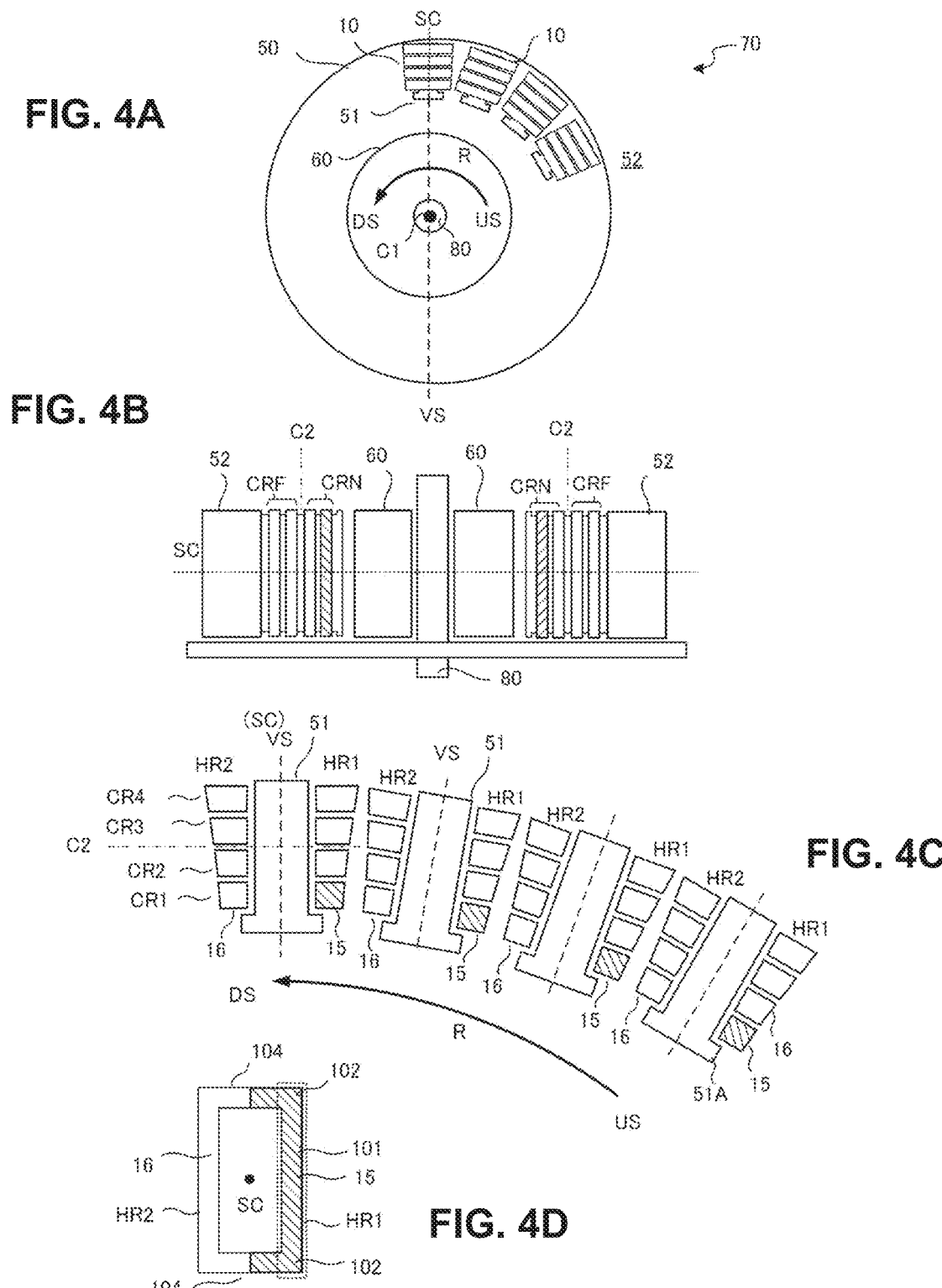

FIGS. 4A-4D includes schematic views illustrating a part of a motor 70 including the coil 10 of some embodiments, in which FIG. 4A is a schematic plan view of a rotor 60 and a stator 50 as viewed in a direction of a rotation shaft of the motor 70 (rotor 60), and FIG. 4B is a schematic side view in a case where the motor 70 is arranged so that the rotation shaft extends in the up-down direction of the figure. Here, as an example, the motor 70 of an inner rotor type in which the rotor 60 is arranged on the inner side (inner circumferential side) of the stator 50 will be described. FIG. 4C is an enlarged view of the part provided with the coil 10 in FIG. 4A as a cross-sectional view (FIG. 2A, 2C, 2E, or 2G) corresponding to the cross-section along the line A-A in FIG. 1A. Also, FIG. 4D is a schematic front view of one coil in FIG. 4C as viewed in the direction of the helical axis SC (rotation shaft of the motor 70).

As illustrated in FIGS. 4A and 4B, the motor (for example, a single-phase motor or a three-phase motor) 70 includes a rotation shaft (shaft) 80, the rotor 60, the stator 50, and the like and is assembled so that the rotor 60 is rotatable with respect to the stator 50. The shaft 80 is a columnar member and is rotated around the central axis thereof while being supported by, for example, a bearing (not illustrated). To the end of the shaft 80, a device (not illustrated) to be driven is connected via a power transmission mechanism such as a gear.

The rotor 60 is provided with a magnet in the circumferential direction thereof and is rotated together with the shaft 80 although detailed illustration of the rotor 60 is omitted. The stator 50 is arranged on the outer side of the rotor 60 in the radial direction, for example, and generates power to rotate the rotor 60 by means of the coil 10 arranged in the circumferential direction. An external terminal of the stator 50 is connected via, for example, a lead wire to a driving circuit or power supply (both not illustrated) that supply electric power to the motor.

As illustrated in FIGS. 4A-4C, the stator 50 includes a plurality of coils 10 and an annular stator member (stator core) 52 having a plurality of teeth 51 arranged annularly. The coil 10 is similar to one described above and is covered on the periphery thereof (periphery of the flat conductor) with an insulating resin (not illustrated here) or the like, for example, in continuity with the helical traveling to insulate the respective one-turn regions CR from one another. The coil 10 is attached to each of the teeth 51 via, for example, an insulator (not illustrated).

The motor 70 supplies driving current from the power supply or the driving circuit to the coil 10 via a wiring member such as a bus bar (not illustrated). By doing so, magnetic flux is generated in (the teeth 51 of) the stator 50. Then, due to the effect of the magnetic flux between the teeth 51 and the magnet, torque in the circumferential direction is generated. As a result, the rotor 60 is rotated with respect to the stator 50 around the central axis of the shaft 80. Here, as an example, a rotation direction R of the rotor 60 at the time of normal operation is a predetermined direction (counterclockwise direction in the illustrated example).

An example of a method for attaching the coil 10 formed as the helical structure body having an approximately quadrangular pyramidal trapezoidal shape as illustrated in FIGS. 1A-1C is as follows. The teeth 51 are formed to be attachable to and detachable from the inside surface of the stator member 52 by, for example, a not-illustrated engaging (fitting) unit or the like. The teeth 51 are inserted into the coil 10 (axial center portion) and are secured to the stator member 52. For example, the teeth 51 have a flange portion 51A, similar to a bobbin, on one side thereof in the direction of the helical axis SC of the coil 10. This structure prevents the coil 10 from coming off of the tooth 51. Alternatively, the tooth 51 may have a cassette form that can be separated (split) and engaged along the direction of the helical axis SC of the coil 10 so as to have a configuration in which the two cassettes are inserted into the coil 10 from both sides (sides provided with the end portions T1 and T2, respectively) of the coil 10 in the direction of the helical axis SC and are engaged while being nipped to attach the coil 10 to the tooth 51, and in which the tooth 51 is attached to the stator member 52. In this case, as for the attaching direction of each coil 10 having an approximately quadrangular pyramidal trapezoidal shape, the coil 10 is attached so that the one-turn region CR whose shorter side 104 is the shortest (the first-layer one-turn region CR1 in the above-described example) is arranged on the side provided with the flange portion 51A or on the side nearest to the rotor 60.

The coil 10 of some embodiments is attached to the stator 50 so that the helical axis SC thereof is located in a virtual cutting plane VS (the large dotted line in FIG. 4A and the cross-section in FIG. 4B) including a rotation shaft central line C1 of the motor 70 (rotor 60) and extends in the diameter direction of the stator 50 or the rotor 60. The virtual cutting plane VS, which includes the rotation shaft central line C1 of the rotor 60, may be rephrased as a cross-section whose cutting line is a line segment corresponding to the diameter of the rotor 60.

In the coil 10 in this case, for example, as illustrated in FIGS. 4B and 4C, at least a part of the one-turn region near the rotor 60 (hereinbelow referred to as "a near side one-turn region CRN"), out of the plurality of one-turn regions CR stacked in the direction of the helical axis SC, is constituted of the first member 15 while at least a part of the one-turn region far from the rotor 60 (hereinbelow referred to as "a far side one-turn region CRF") is constituted of the second member 16. That is, the near side one-turn region CRN includes the first one-turn region CRa while the far side one-turn region CRF includes the second one-turn region CRb. More preferably, in the coil 10, at least a part of the one-turn region CR of the near side one-turn region CRN is constituted of the first member 15 while the one-turn region CR of the far side one-turn region CRF is constituted of only the second member 16.

Whether each one-turn region CR is near or far from the rotor 60 is determined with reference to a center (hereinbelow referred to as "a stacking direction center C2") in a stacking direction of the one-turn regions CR in the coil 10 (a lamination direction or a direction along the length of the helical axis SC) as illustrated in FIGS. 4B and 4C. That is, one or a plurality of layers of one-turn regions CR located nearer the side provided with the rotor 60 than the stacking direction center C2 are referred to as the near side one-turn region CRN while one or a plurality of layers of one-turn regions CR farther from the rotor 60 than the stacking direction center C2 are referred to as the far side one-turn region CRF.

Specifically, as illustrated in FIGS. 4B and 4C, at least a part of at least the one-turn region CR (first-layer one-turn region CR1) nearest the rotor 60 (that is, on the innermost circumferential side of the stator 50 in the case of the inner rotor type) out of the near side one-turn regions CRN includes the first member 15. More specifically, at least a part of a half-turn region in a certain one-turn region CR (for example, the first-layer one-turn region CR) is provided with the first member 15.

Here, the half-turn region in the one-turn region CR will further be described. Referring to FIGS. 4C and 4D, when a certain coil 10 attached to the stator 50 is cut along the virtual cutting plane VS including the rotation shaft central line C1 of the rotor 60, each of the one-turn regions CR is divided into a first half-turn region HR1 and a second half-turn region HR2. These are classified as an upstream side and a downstream side in terms of the rotation direction of the rotor 60. For example, the first half-turn region HR1 is a half-turn region on an upstream US side (a rotation rear side or a rotation source side) in the rotation direction of the rotor 60 while the second half-turn region HR2 is a half-turn region on a downstream DS side (a rotation destination side) in the rotation direction of the rotor 60.

In some embodiments, in at least one one-turn region CR (specifically, at least the first-layer one-turn region CR1 nearest to the rotor 60) in the near side one-turn region CRN of the coil 10, at least a part (in this example, the entirety of the first half-turn region HR1) of the first half-turn region HR1 on the upstream US side in the rotation direction of the rotor 60 is constituted of the first member 15. Meanwhile at least a part (in this example, the entirety of the second half-turn region HR2) of the second half-turn region HR2 is constituted of the second member 16.

Also, in this example, the second half-turn region HR2 of the first-layer one-turn region CR1 and the second-layer one-turn region CR2 connected thereto to the fourth-layer one-turn region CR4 are constituted of the second member 16 as illustrated in FIGS. 2A and 2B.

The arrangement region of the first member 15 is determined from an analysis result of Joule loss in the coil. The analysis of Joule loss in the coil conducted by the present applicant will be described with reference to FIGS. 5A-5C, 6A-6B, 7, and 8A-8G.

In particular, when attention is focused on the component materials for the coil, it is considered that the Joule loss generated in the coil at the time of motor driving is caused mainly by power loss generated from winding resistance (R) of the coil and flowing current (I) (P=I2×R, hereinbelow referred to simply as "copper loss") and loss due to eddy current among loss types (iron loss) including hysteresis loss and eddy current loss (hereinbelow referred to simply as "eddy current loss"). Note that the hysteresis loss is caused by changes of the magnetic flux density in relation to the magnetic field of a member (material), but the member (in this example, the copper member and the aluminum member) generally used for the coil 10 generates almost no magnetic flux density even in the magnetic field.

At present, as a coil for a motor, a coil (hereinbelow, a copper-made coil) made of a copper member in its entirety (in all of the one-turn regions CR) and a coil (hereinbelow, an aluminum-made coil) made of an aluminum member in its entirety (in all of the one-turn regions CR) are known.

Figure 5A:
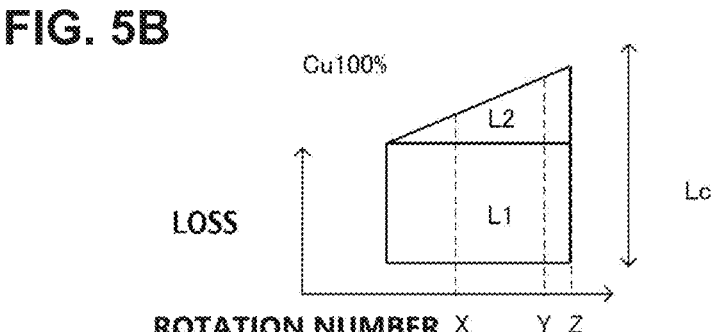
FIG. 5A is a schematic view illustrating a relationship between Joule loss and a rotation number of a conventional motor.
Figure 5B:
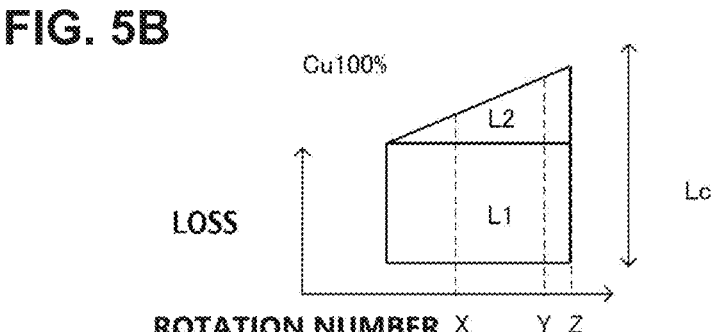
FIG. 5B is a schematic view illustrating a relationship between Joule loss generated in a copper-made coil and a rotation number of a motor.
Figure 5C:
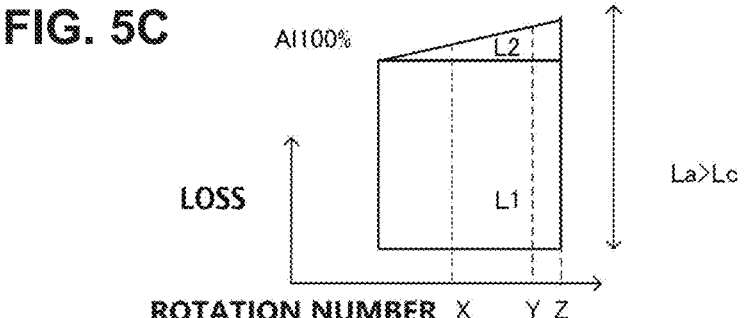
FIG. 5C is a schematic view illustrating a relationship between Joule loss generated in an aluminum-made coil and a rotation number of a motor.

FIGS. 5A-5C schematically illustrates a general relationship between rotation number and loss (W) of a motor. As illustrated in FIG. 5A, the loss caused by the heat of the motor mainly includes so-called copper loss L1, iron loss L2, and machine loss L3. The copper loss L1 does not change in relation to the rotation number since the copper loss is based on a value unique to the member. On the other hand, the iron loss L2 and the machine loss L3 tend to increase as the rotation number increases (speed-up).

In a case where a certain coil is used in a motor, Joule loss is generated in the coil at the time of driving the motor. It can be concluded that the Joule loss generated in the coil is mostly caused by the copper loss (power loss generated from winding resistance (R) of the coil and flowing current (I)) and the eddy current loss (alternating-current loss caused by the eddy current due to the current flowing in the coil and the interlinkage magnetic flux to the coil).

Each of FIGS. 5B and 5C is a schematic view illustrated by replacing the relationship between the rotation number and the loss of the motor illustrated in FIG. 5A with a relationship, in a case where a certain coil is used in a motor, between rotation number of the motor and Joule loss generated in the coil at the time of driving the motor. FIG. 5B is a view schematically illustrating a relationship between Joule loss generated in a copper-made coil and motor rotation number, and FIG. 5C is a view schematically illustrating a relationship between Joule loss generated in an aluminum-made coil and motor rotation number. The direction of the horizontal axis represents rotation number (rotation speed (r/min)), and the direction of the vertical axis represents loss (Joule loss (W)). Also, here, particularly from the viewpoint of the component materials for the coil, the relationship between the copper loss L1 and the iron loss L2 is schematically illustrated, and the iron loss L2 particularly indicates the eddy current loss (the same applies to the following description).

As illustrated in FIGS. 5B and 5C, when a case of low rotation number X and a case of high rotation number Y are compared in an operating range of a conventional general motor (for example, a range to a maximum allowable rotation speed Z), the copper loss L1 tends not to change, and the eddy current loss L2 tends to increase as the rotation number increases. Also, when the copper-made coil (FIG. 5B) and the aluminum-made coil (FIG. 5C) are compared, the copper-made coil relatively has low copper loss L1 and high eddy current loss L2 while the aluminum-made coil relatively has low eddy current loss L2 and high copper loss L1.

Also, it has been considered that, regardless of the member type, the influence of the eddy current loss L2 on the percentage of the entire loss (Joule loss) is small, and the value of the copper loss L1 has an influence, whereby Joule loss La of the aluminum-made coil is higher than Joule loss Lc of the copper-made coil.

Based on such knowledge, the present applicant conducted experiments in which a motor that uses a copper-made coil having an original shape and a motor that uses an aluminum-made coil having an original shape are each operated under various conditions. The coil used in the experiments is, similarly to the coil 10 of some embodiments illustrated in FIGS. 1A-1C and the like, a coil configured to have approximately rectangular outer and inner peripheral shapes in a plan view by connecting a plurality of coil pieces C to have a helical structure. The coil with this configuration is a coil having a shape that the present applicant has originally developed and is hereinbelow referred to as an "Aster coil" for convenience of description. All of the coils described below are Aster coils.

It was predicted that, even in a case of a motor using the Aster coil, the relationship between the motor rotation number and the Joule loss generated in the coil would have a similar tendency to that in FIGS. 5B and 5C, and in a high rotation number range, the Joule loss La of the aluminum-made coil would be higher than that of the copper-made coil.

However, the experiment results showed that, even in the case of the aluminum-made coil, heat generation tended to be suppressed to cause the Joule loss to be suppressed (not to increase as predicted) during operation in a certain high rotation number range. That is, it was considered that, in the certain high rotation number range, the characteristics of the Joule loss generated in the copper-made coil might be switched to those of the Joule loss generated in the aluminum-made coil. Also, in this case, since the copper loss L1 did not change in any rotation number, it was predicted that, in the certain high rotation number range, the eddy current loss L2 would have an influence (become dominant).

Then, the Joule loss generated in the copper-made coil was analyzed in detail per portion. The copper-made coil is a coil obtained by constituting the coil 10 illustrated in FIG. 4C by a copper member in its entirety (100%), and the configuration of the motor 70 other than the coil is similar to that in FIGS. 4A and 4B. Also, the rotation direction of the rotor 60 is a counterclockwise direction.

Figure 6A:
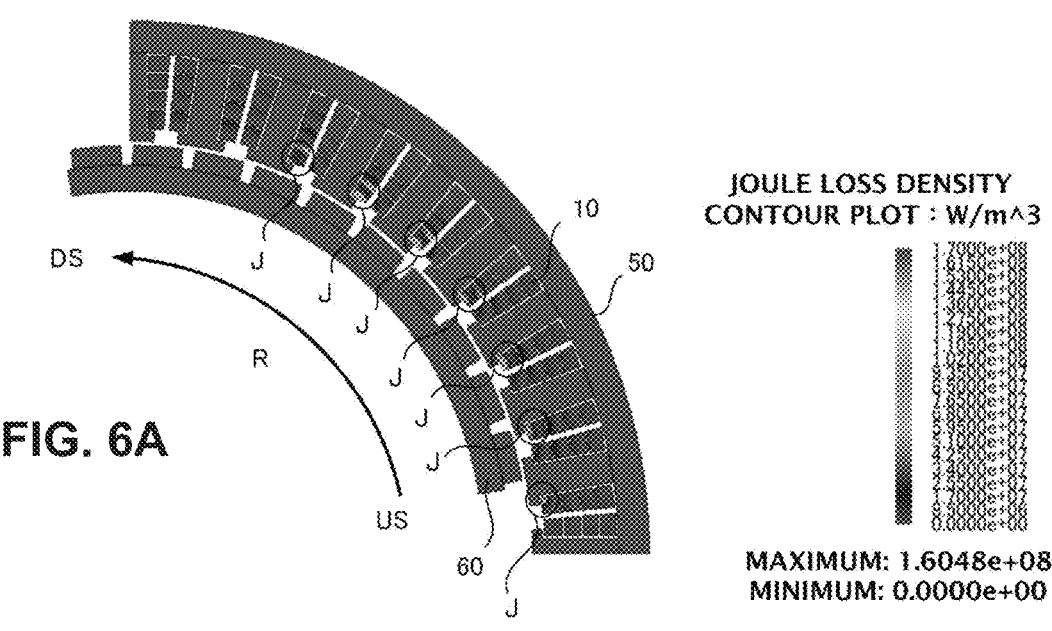
FIGS. 6A-6B is a view illustrating Joule loss density generated in the copper-made coil.
Figure 6B:
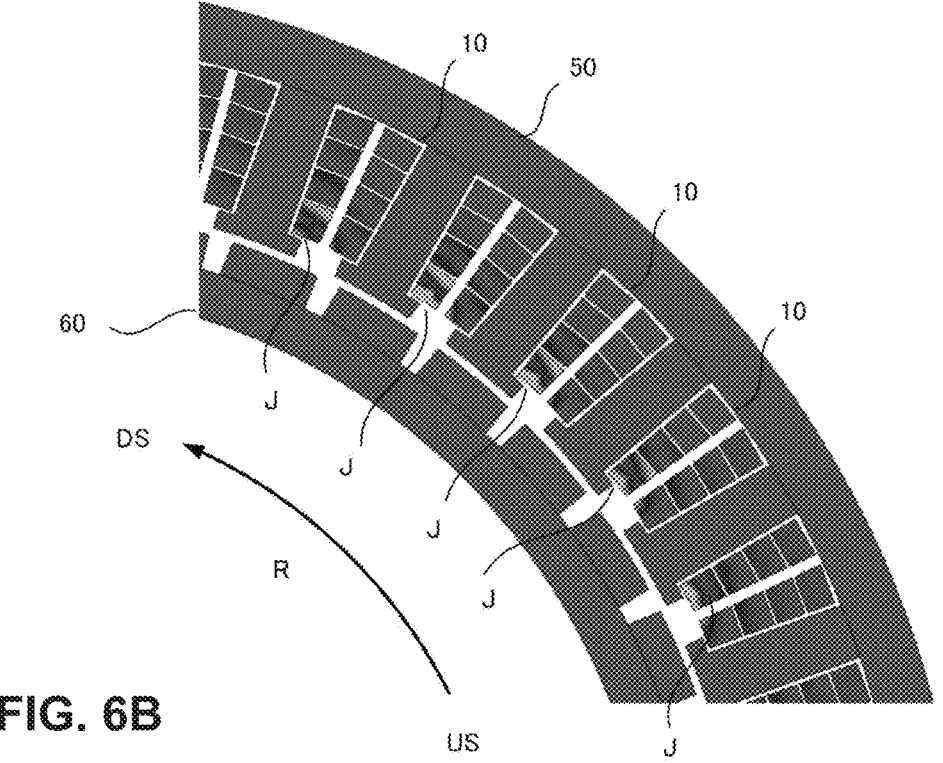

FIG. 6A illustrates an analysis result of Joule loss density [W/m$^3$] generated in the copper-made coil, and FIG. 6B is an enlarged view of FIG. 6A.

As illustrated in FIGS. 6A-6B, Joule loss was locally concentrated on a region (circled) particularly on the upstream US side in the rotation direction of the rotor 60 in the one-turn region CR nearest to the rotor 60 (first-layer one-turn region CR1) in the copper-made coil. Hereinbelow, the region on which Joule loss is locally concentrated in the copper-made coil (Aster coil constituted of a copper member in its entirety) is referred to as a "Joule loss concentrated region J". Also, Joule loss was generated less on the downstream DS side in the rotation direction of the rotor 60 and less at a place farther from the rotor 60. Note that the Joule loss in this analysis includes the copper loss and the eddy current loss. However, it is considered that the copper loss is generated substantially uniformly regardless of the distance between the one-turn region CR and the rotor 60. That is, it can be concluded that the Joule loss due to the eddy current loss appears in FIG. 6A.

Specifically, while the measured value as the Joule loss density in the Joule loss concentrated region J was a maximum of, for example, about $7\times10^7$ [W/m$^3$] to about $10\times10^7$ [W/m$^3$], the measured value on the downstream DS side in the rotation direction of the rotor 60 even in the same one-turn region CR was about $6\times10^7$ [W/m$^3$] at most, and the measured value in the second-layer one-turn region CR2 even on the upstream US side in the rotation direction of the rotor 60 was about $3\times10^7$ [W/m$^3$] at most.

Figure 7:
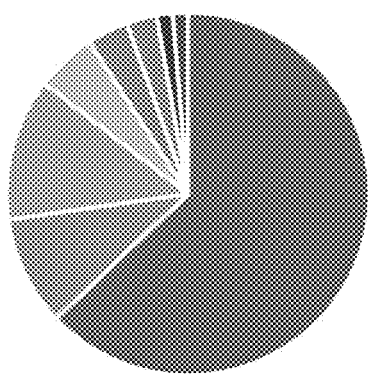
FIG. 7 is a view illustrating Joule loss percentages generated in the copper-made coil.

Furthermore, the Joule loss percentages in the first half-turn region HR1 and the second half-turn region HR2 of the respective one-turn regions CR of the copper-made coil were calculated. FIG. 7 is a pie chart illustrating the result. As a result of calculating the Joule loss percentages in the half-turn region (first half-turn region HR1) on the upstream US side in the rotation direction of the rotor 60 and the half-turn region (second half-turn region HR2) on the downstream DS side in the rotation direction of the rotor 60 regarding the respective layers from the first-layer one-turn region CR1 to the fourth-layer one-turn region CR4 of the copper-made coil, it was found that the loss in the region (that is, the first half-turn region HR1 of the first-layer one-turn region CR1) nearest to the rotor 60 and located on the upstream US side in the rotation direction of the rotor 60 accounts for about 60 to 70 percent of the total.

It was clarified from these results that the Joule loss concentrated region J generated in the copper-made coil was locally concentrated on the region (that is, the first half-turn region HR1 of the first-layer one-turn region CR1) nearest to the rotor 60 and located on the upstream US side in the rotation direction of the rotor 60. Note that a case of the aluminum-made coil had a similar tendency to the above as a result of a similar analysis although the values were different. That is, it was considered that the coil (Aster coil) had some regions (portions) in which the eddy current loss is lower than a reference value (for example, a value of the eddy current loss in the entire coil (such as an average value of eddy current loss values in plural portions of the coil) and other regions (portions) in which the eddy current loss is higher than the reference value.

Also, as described above, since, even in the case of the aluminum-made coil motor, the Joule loss tends to be suppressed (not to increase as predicted) during operation in the certain high rotation number range, it was predicted that, in this range, there would exist a range where the magnitude relationship between the eddy current loss in the copper-made coil and the eddy current loss in the aluminum-made coil is reversed in relation to the generation state of the Joule loss concentrated region J (generation portion of the eddy current loss).

Figure 8A:
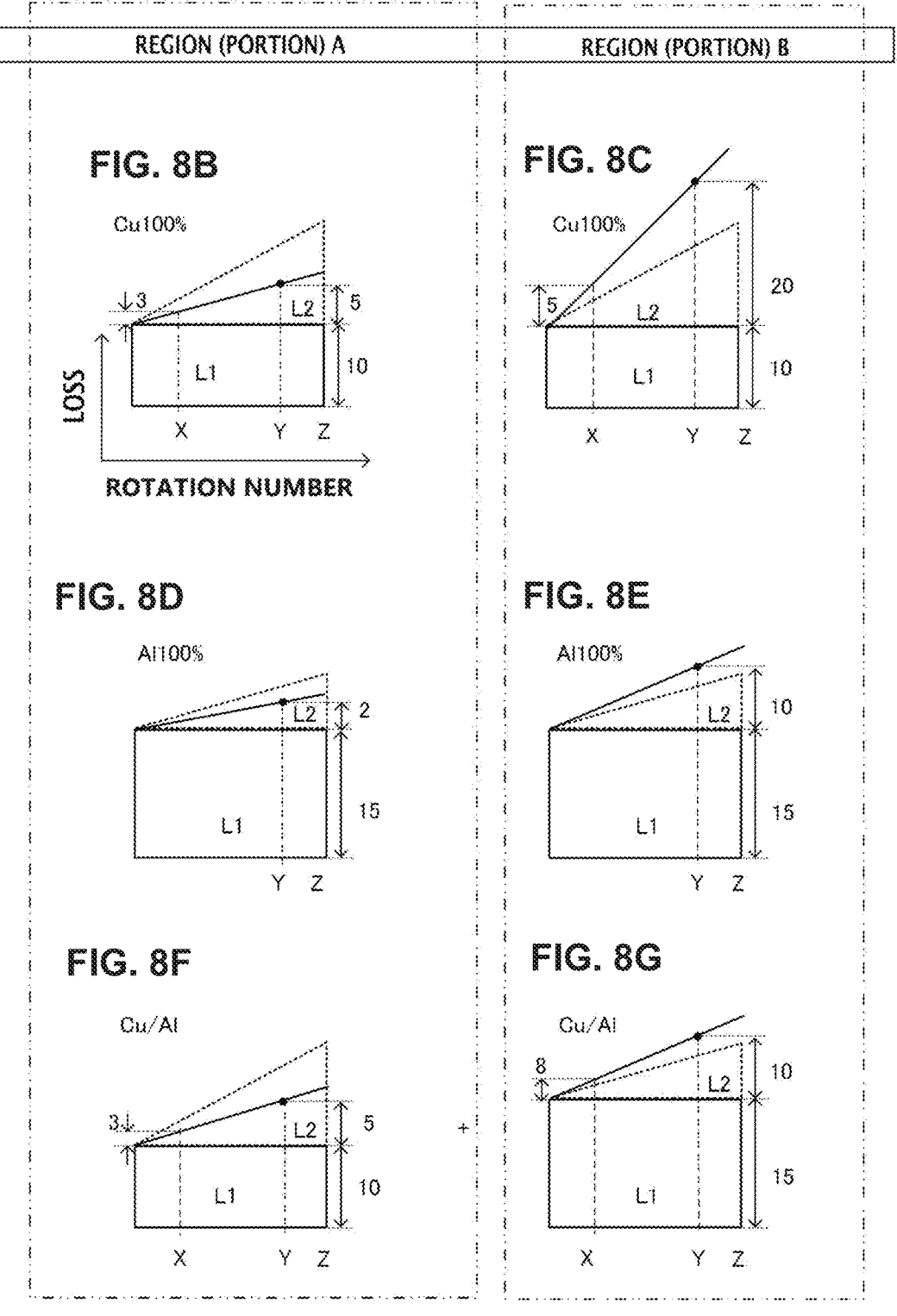

A description will further be provided with reference to the schematic views in FIGS. 8A-8G. FIG. 8A is a schematic view of a long member in a plan view obtained by spreading out the coil, and FIGS. 8B-8E are views schematically illustrating the relationship between the rotation number of the motor using the Aster coil and the Joule loss generated in the coil at the time of driving the motor in a similar manner to FIGS. 5B and 5C. FIGS. 8B and 8C illustrate a case of the copper-made coil, and FIGS. 8D and 8E illustrate a case of the aluminum-made coil. FIGS. 8F and 8G illustrate a case where the coil 10 of some embodiments is used in the motor 70. In FIGS. 8B-8G, the direction of the horizontal axis represents rotation number (rotation speed (r/min)) of the coil, and the direction of the vertical axis represents loss (Joule loss (W)).

As illustrated in FIG. 8A, the coil includes a region (portion) A in which the eddy current loss L2 is low and a region (portion) B in which the eddy current loss L2 is high (refer to FIGS. 6 and 7). Here, an example in which the coil is divided into two regions: a region including the region A and a region including the region B, setting the "eddy current loss L2 in the entire coil" as a reference (center), will be described. The "eddy current loss L2 in the entire coil" as a reference is a value obtained by dividing each of the first-layer one-turn region CR1 to the fourth-layer one-turn region CR4 into the first half-turn region HR1 and the second half-turn region HR2, calculating the eddy current loss L2 for each of the eight half-turn regions for one coil, and summing up the values.

FIG. 8A illustrates the member divided into the regions A and B on the left and right for convenience of description, and it does not mean that FIG. 8A corresponds to the plan view in FIGS. 2A-2H. Each of FIGS. 8B, 8D, and 8F is a schematic view illustrating the relationship between the rotation number of the motor and the Joule loss generated in the coil at the time of driving the motor in the region A, where the eddy current loss L2 is low, in the coil and each of FIGS. 8C, 8E, and 8G is a schematic view illustrating the relationship between the rotation number of the motor and the Joule loss generated in the coil at the time of driving the motor in the region B, where the eddy current loss L2 is high, in the coil.

For example, each of FIGS. 8B and 8C is a schematic view in a case where the motor using the copper-made coil is operated in a certain range including the high rotation number Y. Also, the range of the eddy current loss L2 illustrated by the dotted triangle in each of FIGS. 8B and 8C represents the eddy current loss L2 (value obtained by calculating the eddy current loss for each of the eight half-turn regions for one coil and summing up the values) in the entire coil as a reference.

As illustrated in FIG. 8B, in the region A, where the eddy current loss is low, the eddy current loss L2, as illustrated by the solid line, is lower than the reference eddy current loss (dotted line), and the change amount (slope) is also low. In a case of operation at the high rotation number Y, the copper loss L1 is, for example, 10 while the eddy current loss L2 is, for example, 5, and the Joule loss is 15 (=10+5). Note that the loss values are conceptual values used merely for convenience of description of the magnitude relationship and are not values having other meanings (for example, representing the ratio) (as for FIGS. 8A-8G, the same applies to the following description).

On the other hand, as illustrated in FIG. 8C, in the region B, where the eddy current loss is high, the eddy current loss L2, as illustrated by the solid line, is higher than the reference eddy current loss (dotted line), and the change amount (slope) is also high. In a case of operation at the same high rotation number Y, the copper loss L1 is, for example, 10 while the eddy current loss L2 is, for example, 20, and the Joule loss seems to be 30 (=10+20).

In a case where the entire copper-made coil is regarded as, for example, the region into which the regions A and B are combined, the Joule loss is regarded as the sum of FIGS. 8B and 8C, which is 45 (=15+30) in this case.

Each of FIGS. 8D and 8E is a schematic view in a case where the motor using the aluminum-made coil is operated in a certain range including the high rotation number Y. In this case as well, the range of the eddy current loss L2 illustrated by the dotted triangle in each of FIGS. 8D and 8E represents the eddy current loss in the entire coil as a reference.

As illustrated in FIG. 8D, in the region A, where the eddy current loss L2 is low, the eddy current loss L2, as illustrated by the solid line, is lower than the reference eddy current loss (dotted line), and the change amount (slope) is also low. In a case of operation at the high rotation number Y, the copper loss L1 is, for example, 15 (higher than in the case of the copper-made coil) while the eddy current loss L2 is, for example, 2 (lower than in the case of the copper-made coil), and the Joule loss is 17 (=15+2; higher than in the case of the copper-made coil).

In addition, as illustrated in FIG. 8E, in the case of the aluminum-made coil operated at the same high rotation number Y in the region B where the eddy current loss is high (region where the eddy current loss is higher than the reference eddy current loss (dotted line)), the eddy current loss L2, as illustrated by the solid line, is higher than the reference eddy current loss (dotted line), and the change amount (slope) is also high. However, unlike the conventional prediction, the change amount seems not to be as high as in the case of the copper-made coil. When expressed by specific values, the copper loss L1 is, for example, 15 while the eddy current loss L2 is, for example, 10, and the Joule loss is 25 (=15+10).

The entire Joule loss of this aluminum-made coil is regarded as the sum of FIGS. 8D and 8E, which is 42 (=17+25) in this case.

In this manner, the present applicant has conceived that, in a case of operation in a range including the high rotation number Y, in the region B where the eddy current loss L2 is high, the magnitude relationship between the Joule loss in the aluminum-made coil and the Joule loss in the copper-made coil is reversed (FIGS. 8C and 8E). From these results, the present applicant has conceived that, by using as a coil 10 used in a motor 70 a copper member, in which the copper loss L1 having a large percentage of the Joule loss is relatively low, as a base material, that is, using the copper-made coil as a base material, and using in combination a member having a higher resistance value than the copper member (for example, an aluminum member) partially in the Joule loss concentrated region J of the copper-made coil, the Joule loss concentrated region J of the copper-made coil can be reduced or eliminated.

FIGS. 8F and 8G are schematic views in a case where the motor 70 using the coil 10 (coil made of a copper member and an aluminum member) of some embodiments is operated in a certain range including the high rotation number Y. In this case as well, the range of the eddy current loss L2 illustrated by the dotted triangle in each of FIGS. 8F and 8G represents the eddy current loss in the entire coil as a reference.

FIG. 8F is a copy of FIG. 8B, and FIG. 8G is a copy of FIG. 8E. It is considered that the Joule loss of the entire motor 70 using the coil 10 is the sum of FIGS. 8F and 8G, which is 40 (=15+25) in this case, and is lower than the Joule loss (45) of the entire copper-made coil and the Joule loss (42) of the entire aluminum-made coil.

In this manner, the present applicant has arrived at the coil 10 of some embodiments using the second member 16 (for example, a copper member) having a relatively low resistance value (having a low copper loss L1) as a base member for the coil and including the first member 15 (for example, an aluminum member) having a relatively low eddy current loss L2 (having a relatively high resistance value) only in a partial region including the Joule loss concentrated region J in a coil (for example, a copper-made coil) constituted of only the base member (second member 16) in its entirety.

Figure 9:
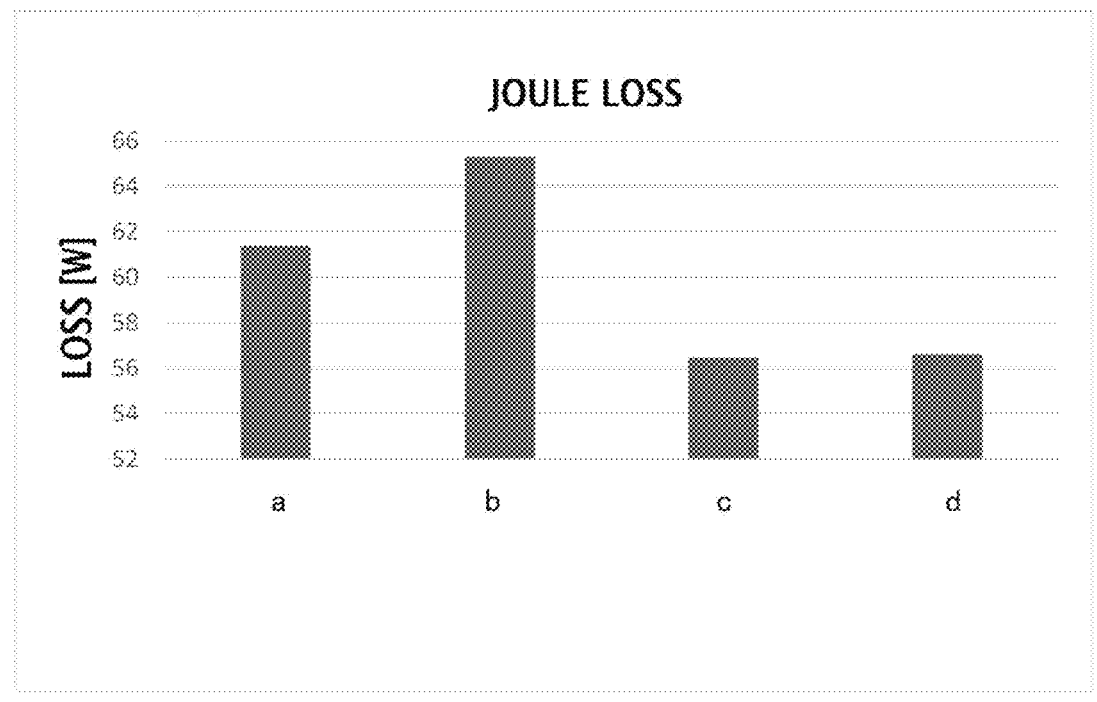
FIG. 9 is a view illustrating a comparison of Joule loss in the coils having conventional structures and that in the coils of some embodiments.

FIG. 9 is a graph making a comparison of the Joule loss generated in the entire coil in a case where motors respectively using the conventional coils and the coils 10 of some embodiments are operated in the aforementioned range including the high rotation number Y. Here, the Joule loss generated in the entire coil is a value obtained by calculating the Joule loss for each of the eight half-turn regions for one coil and summing up the values. In FIG. 9, "a" is the aluminum-made coil, and "b" is the copper-made coil. Also, "c" is the coil 10 constituted of a composite material in which the entirety of the first-layer one-turn region CR1 is constituted of the first member 15 and the rest is constituted of the second member 16 as illustrated in FIG. 2C in some embodiments. Furthermore, "d" is the coil 10 constituted of a composite material in which the first half-turn region HR1 of the first-layer one-turn region CR1 is constituted of the first member 15, and the rest is constituted of the second member 16 as illustrated in FIGS. 2A and 4A-4D in the present embodiment. The four types of coils have the same in terms of the size of the coil, the shape of the conductor (flat conductor), and the number of times of winding.

As a result, it has been revealed that the coil 10 of some embodiments can reduce Joule loss drastically as compared with the copper-made coil and the aluminum-made coil. Note that, based on the result in FIG. 9, the Joule loss of the copper-made coil (b) is higher than that of the aluminum-made coil (a) in a range including the high rotation number Y. That is, this result coincides with the magnitude relationship of the Joule loss values (Joule loss (for example, value 45) of entire copper-made coil>Joule loss (for example, value 42) of entire aluminum-made coil) in the explanation using the schematic views in FIGS. 8B-8E.

Here, an operation range including the low rotation number X will be examined. For example, assuming that the eddy current loss L2 generated in the copper-made coil in a case where the motor is operated in the low rotation number X is 3 in FIG. 8B, and the eddy current loss L2 in a case where the motor is operated in the low rotation number X is 5 in FIG. 8C, the sum of the Joule loss values of the entire coil is 28 (=(3+10)+(5+10)).

Also, assuming that the eddy current loss L2 generated in the coil 10 of some embodiments in a case where the motor is operated in the low rotation number X is 3 in FIG. 8F, and the eddy current loss L2 in a case where the motor is operated in the low rotation number X is 8 in FIG. 8G, the sum of the Joule loss values of the entire coil 10 of some embodiments is 36 (=(3+10)+(8+15)). That is, in a case where the coil 10 of some embodiments is operated in the range including the low rotation number X, the eddy current loss L2 is higher than in the case of the copper-made coil.

In this manner, compared with a case where a motor including a coil (for example, the copper-made coil) in which all of the one-turn regions CR are constituted of the second member 16 and which has the same shape is assumed to be produced and operated, the motor 70 using the coil 10 of some embodiments has a lower loss in a high rotation number range (range including the high rotation number Y) than the motor using the copper-made coil (the Joule loss of the coil 10 is lower than that of the coil (copper-made coil) of the motor), whereas the motor 70 has higher loss in a low rotation number range (range including the low rotation number X) than the motor using the copper-made coil (the Joule loss of the coil 10 is higher than that of the copper-made coil).

Nevertheless, for the efficiency of the motor 70, improvement in a high load range (a range including the high rotation number Y, a high torque range) is more effective for the motor 70 than improvement in a low load range (a range including the low rotation number X, a low torque range).

Thus, in some embodiments, improvement of Joule loss in a high load range for the motor 70 is set as one of purposes, and the motor 70 including the coil 10 of some embodiments is used, preferably particularly, in an operation range including the high rotation number (rate of rotation) Y. The "operation range including the high rotation number Y" in some embodiments is, for example, a range of rotation number (rate of rotation) in which the eddy current loss L2 is generated, and an example thereof is, in a case where a range from the lowest value to the highest value (maximum allowable rotation number Z) of rotation number of the motor 70 (when used normally) is 100(%), a range from 20 to 100(%), preferably a range from 30 to 100(%). Alternatively, the range is an operation range in which current having a frequency of dozens of Hz is input, preferably an operation range in which current having a frequency of 100 Hz or higher is input.

Specifically, a method for controlling the motor of some embodiments includes, in a case where a motor including a conventional copper-made coil having the same shape of coil of some embodiments is assumed to be operated, operating the motor 70 under a condition under which a high rotation number range (frequency) in which the motor 70 including the coil 10 of some embodiments has a lower Joule loss than the motor including the conventional copper-made coil is included. By doing so, generation of eddy current loss in the entire operation range of the motor can be suppressed, and Joule loss can be reduced.

Figure 10A:
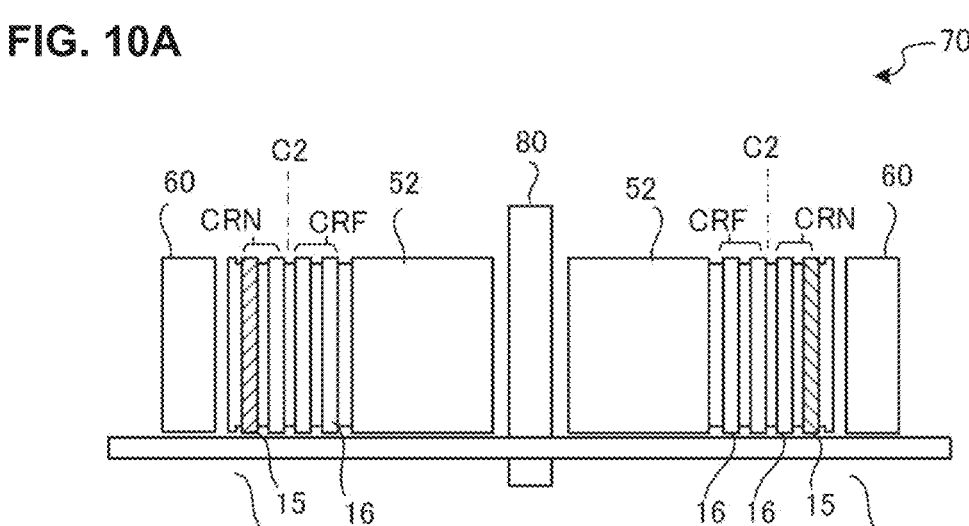
Figure 10B:
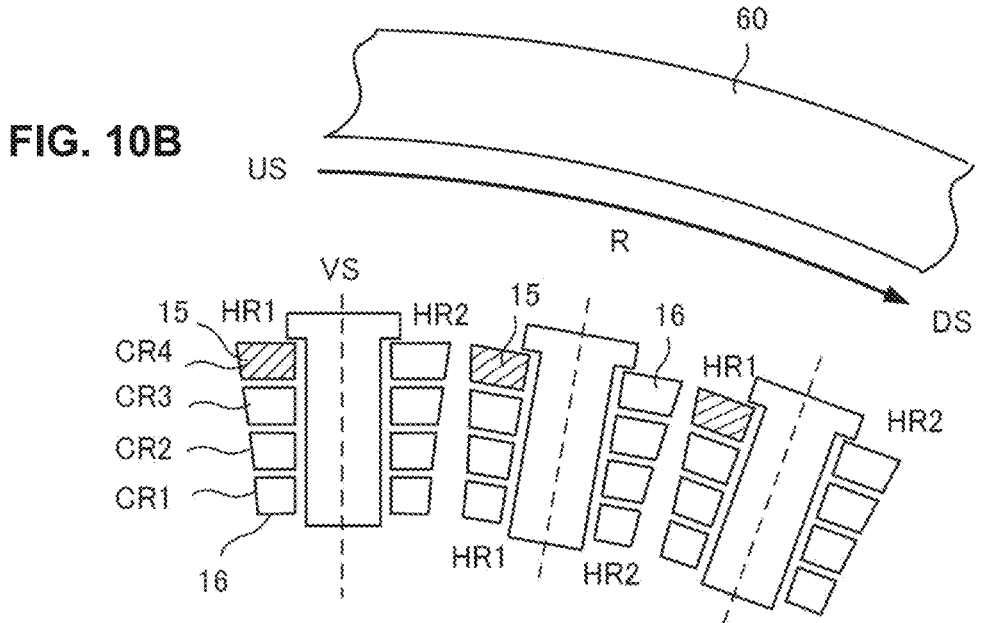

FIGS. 10A-10B includes vies illustrating an example of an outer-rotor type motor in which the rotor 60 is arranged on the outer side (outer circumferential side) of the stator 50 as another example of the motor 70, in which FIG. 10A is a lateral cross-sectional view corresponding to FIG. 4B, and FIG. 10B is a plan view corresponding to FIG. 4C. In the case of the outer-rotor type motor 70, the outermost coil 10 in the radial direction of the stator 50 is the coil 10 nearest to the rotor 60. In this case, as for the attaching direction of each coil 10 having an approximately quadrangular pyramidal trapezoidal shape, for example, the coil 10 is attached so that the one-turn region CR (the fourth-layer one-turn region CR4 in the above-described example) whose shorter side 104 is the longest is arranged on the side provided with the flange portion 51A or on the side nearest to the rotor 60. Also, the rotation direction of the rotor 60 is, for example, a clockwise direction.

In a case of such a motor 70, at least a part (the hatched half-turn region (first half-turn region HR1)) of the one-turn region CR (in this example, the fourth-layer one-turn region CR4) nearest to the rotor 60 at least on the upstream US side in the rotation direction of the rotor 60 is constituted of the first member 15 while the rest is constituted of the second member 16. By doing so, Joule loss can be reduced. That is, this can be achieved, and similar effects can be obtained even in a case where the motor 70 is of the outer-rotor type.

In this manner, the coil 10 of some embodiments is configured to have a helical structure of one (single linear or single strip-like) long member, and the long member is constituted of a conductor in which a plurality of (two) different types of materials are connected in the longitudinal direction.

One (first member 15) of the different types of materials is a member that has a higher resistance value than the other (second member 16) and which can suppress generation of eddy current.

Also, in a case of using the coil 10 in the motor 70, the first member 15 is arranged at least in the Joule loss concentrated region J of a coil, assumed to produced, constituted of the second member 16 in its entirety. Specifically, it is desirable that at least a region nearest to the rotor 60 and located on the upstream US side in the rotation direction of the rotor 60 be constituted of the first member 15.

In the embodiments illustrated in FIGS. 4A-4D, as an example in which at least the region in the coil 10 in the one-turn region CR (first-layer one-turn region CR1) nearest to the rotor 60 and located on the upstream US side in the rotation direction of the rotor 60 is constituted o the first member 15, an example in which the entire first half-turn region HR1 of the first-layer one-turn region CR1 is constituted of the first member 15 has been illustrated (refer to FIG. 4D). However, for example, in a case where the Joule loss concentrated region J (in a case of a copper-made coil (100A)) does not exist in the shorter side 104 or the like of the one-turn region CR, only the longer side 103 (straight portion 101) and the corner portions (direction changing portions) 102 on both sides thereof may be constituted of the first member 15, for example, as illustrated by the dotted line in FIG. 4D. In other words, the minimum unit of the first member 15 is not limited to the half-turn region of the one-turn region CR.

Also, in general, eddy current loss is less influenced by a magnet as the distance from the rotor 60 is longer. This is apparent because it can be concluded that, referring to FIGS. 5A-5B, the Joule loss concentrated region J is negligible, if any, in the third-layer one-turn region CR3 and the fourth-layer one-turn region CR4. That is, in some embodiments, all of the one-turn regions CR in the far side one-turn region CRF may be constituted of the second member 16.

However, there are various conditions for eddy current to increase, such as the strength of magnetic flux, the magnitude of current, and the rotation number (rotation speed) of the motor. Therefore, for example, according to the generation state of the Joule loss, a region in the copper-made coil (100A) in which the Joule loss equal to or higher than a certain threshold value is generated is preferably set as the Joule loss concentrated region J, as needed. Furthermore, the region including at least the Joule loss concentrated region J is preferably constituted of the first member 15, and the other regions is preferably constituted of the second member 16 as needed. The certain threshold value in this case is, for example, a certain ratio (for example, 0.3 times, 0.5 times, 1.2 times, 1.5 times, or preferably 1.7 times) in a case where the Joule loss of the entire coil 10 is 100, and a region including a portion in which Joule loss equal to or higher than the ratio is generated can be set as the Joule loss concentrated region J. Alternatively, an average value of the Joule loss values in a plurality of predetermined portions (for example, one-turn regions CR) in the coil 10 can be set as the threshold value, and a region including a portion in which Joule loss equal to or higher than the average value is generated can be set as the Joule loss concentrated region J. Furthermore, for example, referring to the cross-section in FIG. 4C, Joule loss (average) may be calculated in each of eight cross-sections of the respective portions of each coil 10 (eight cross-sections including the first-layer one-turn region CR1 to the fourth-layer one-turn region CR4 of the first half-turn region HR1 and the first-layer one-turn region CR1 to the fourth-layer one-turn region CR4 of the second half-turn region HR2) (refer to FIGS. 6A-6B), and the portion including the cross-section in first place (to third place, for example) in descending order of Joule loss may be set as the Joule loss concentrated region J.

In addition to this, the arranging region of the first member 15 is appropriately selected according to the generation region of the Joule loss concentrated region J in the copper-made coil. That is, on condition that at least a part of the one-turn region CR nearest to the rotor 60 is composed of the first member 15, various arranging examples can be selected, such as the arranging examples illustrated in FIGS. 2A-2H. In the Aster coil, since a helical structure body is formed by pressure-welding a plurality of coil pieces C having desired shapes, the first member 15 can easily be arranged in a desired freely-selected portion.

Meanwhile, based on the generation portion of the Joule loss concentrated region J, arranging the first member 15 in a portion in the one-turn region CR (near the rotor 60) on the upstream US side in the rotation direction of the rotor 60 may further be a condition. However, in a case of the motor 70 that is rotatable in forward and backward directions, the upstream US in the rotation direction and the downstream DS in the rotation direction are switched when the rotation direction of the rotor 60 is reversed. In such a case, as illustrated in FIG. 2C, it is desirable that substantially the entire turn of the one-turn region CR near the rotor 60 be constituted of the first member 15. In this case as well, the Joule loss can be lower than those in the cases of the copper-made coil and an aluminum-made coil 100B (refer to FIG. 9).

Also, for example, in a case where the operating direction of the motor 70 in a normal state is limited to one direction, as illustrated in FIG. 2G, for example, the half turn portions (for example, the first half-turn region HR1) on the upstream US side in the rotation direction of the rotor 60 in a plurality of respective one-turn regions CR near the rotor 60 (for example, the first-layer one-turn region CR and the second-layer one-turn region CR) may be constituted of the first member 15. That is, the first member 15 may be arranged in the plurality of respective one-turn regions CR with a half turn between them (FIG. 2H).

Furthermore, at least a part of the other one-turn regions CR in the near side one-turn region CRN may be constituted of the first member 15 (may include the first member 15). Also, the number of layers of the one-turn regions CR including the first member 15 may be one or plural.

In this manner, in the coil 10 of some embodiments, particularly in a case where the coil 10 is used in the motor 70, at least a part of the one-turn regions CR in the near side one-turn region CRN is preferably constituted of the first member 15 (preferably includes the first member 15), and at least a part nearest to the rotor 60 on the upstream US side in the rotation direction of the rotor 60 is more preferably constituted of the first member 15. However, the arranging region of the first member 15 is appropriately selected according to the characteristics and the cost required for the motor 70.

An example of determining the arranging region of the first member 15 will be provided. As illustrated in FIG. 9, both the coil 10 (c of FIG. 9) in which the entire turn of the one-turn region CR near the rotor 60 (in this case, the first-layer one-turn region CR1) is constituted of the first member 15 and the coil 10 (d of FIG. 9) in which the half turn (the first half-turn region HR1) is constituted of the first member 15 both have substantially equivalent Joule loss. That is, in a case where the operating direction of the motor 70 in a normal state is limited to one direction, either one of them may be selected from a viewpoint of the cost and the weight reduction. For example, in a case where the first member 15 is an aluminum member while the second member 16 is a copper member, the coil 10 (d of FIG. 9) in which the first half-turn region HR1 is constituted of the first member 15 is preferably employed from a viewpoint of the cost and the weight reduction. Also, as described above, in a case where the motor 70 is used to be rotatable in forward and backward directions, the entire turn of the first-layer one-turn region CR1 is preferably constituted of the first member 15.

Also, when the motors 70 using the coils 10 illustrated in FIGS. 2A-2H are compared in terms of Joule loss, although it would vary depending on the rate of rotation and the motor current, the Joule loss becomes higher in FIGS. 2E, 2G, and FIG. 2A or 2C (FIGS. 2A and 2C are equivalent) in this order, for example.

Meanwhile, in some embodiments, for convenience of description, a description has been given of, as the example, the coil 10 whose external shape is an approximately quadrangular pyramidal trapezoidal shape, in which the one-turn region whose shorter side 104 is the shortest is the first-layer one-turn region CR1, and the one-turn region whose shorter side 104 is the longest is the fourth-layer one-turn region CR4 or the sixth-layer one-turn region CR6. However, the direction of stacking (the order of stacking) the one-turn regions CR is not limited to this example, and the one-turn region CR whose shorter side 104 is the longest may be the first-layer one-turn region CR1. That is, only required is a configuration in which, regardless of the order of stacking the one-turn regions CR, a part of the one-turn region near (nearest to) the rotor 60 is constituted of the first member 15.

The present disclosure is not limited to the aforementioned embodiments and can be configured in various embodiments.

For example, the external shape of the coil 10 is not limited to the approximately quadrangular pyramidal trapezoidal shape and may be an approximately rectangular solid shape or an approximately cubic shape.

Also, for example, the coil 10 may be constituted of another conductor instead of the coil piece C made of the flat conductor. That is, the "conductor" in the above-described embodiment includes a flat conductor, a round wire, and a square wire.

Also, the coil 10 may not only be formed by pressure welding the coil pieces C having the corner portions 102 (is not limited to the Aster coil) but may also be formed by winding a long conductor which is as long as a helical structure in a complete state. In this case, the coil 10 as illustrated in FIGS. 2A-2H may be formed so that the first member 15 may reside in a desired region when the coil 10 is completed, for example, by preparing respective linear coil pieces (coil pieces of flat conductor, round wire, or square wire) of the first member 15 and the second member 16, pressure-welding and connecting them, and winding the connected conductor in a helical form. However, in this case as well, each of the one-turn regions (one-turn regions CR) is formed by the conductor making one turn (is constituted by one turn of the conductor), and the plurality of (for example, six layers in FIG. 1B, and four layers in FIGS. 2A-2H and the like) one-turn regions CR are stacked in the direction of the helical axis SC.

Furthermore, a description was given of the above-described embodiments describing, as an example, the first member 15 being an aluminum member, and the second member 16 being a copper member. However, the present disclosure is not limited to this, and as long as the first member 15 is a material having a relatively high resistance compared to that of the second member, the present disclosure can be implemented in a similar manner and similar effects can be obtained even in a case where these members are made of other conductors (including non-metal conductors). For example, on the premise that the first member 15 is a material having a relatively high resistance (electric resistivity) compared to that of the second member, a combination of the first member 15 and the second member 16 can be selected from combinations of members constituted mainly of silver (Ag), copper (Cu), gold (Au), aluminum (Al), or carbon (C, carbon nanotube).

REFERENCE SIGNS LIST

10 coil
13 coil piece welded portion
15 first member
16 second member
50 stator
51 teeth
51A flange portion
52 stator member (stator core)
60 rotor
70 motor
80 rotation shaft (shaft)
100 copper-made coil
101 straight portion
102 corner portion
103 longer side
104 shorter side
105 starting end
106 terminal end
C flat conductor piece (coil piece)
CR one-turn region
CRF far side one-turn region
CRN near side one-turn region
CRa first one-turn region
CRb second one-turn region
HR1 first half-turn region
HR2 second half-turn region
J Joule loss concentrated region
R rotation direction
SC helical axis US upstream in rotation direction
DS downstream in rotation direction
VS virtual cutting plane

The invention claimed is:

1. A coil comprising:

a plurality of one-turn regions stacked in a direction of a helical axis, wherein the coil is attached to a stator of a motor, and out of the plurality of one-turn regions, at least a part of a one-turn region near a rotor is constituted of a first member, and at least a part of a one-turn region far from the rotor is constituted of a second member, wherein:

each of the one-turn regions is divided into a first half-turn region and a second half-turn region along a virtual cutting plane including a rotation shaft central line of the rotor; and in at least one one-turn region in the part of a one-turn region near a rotor, at least a part of the first half-turn region is constituted of the first member, and at least a part of the second half-turn region is constituted by the second member.

2. The coil of claim 1, wherein the part of a one-turn region far from the rotor is constituted of the second member.

3. The coil of claim 1, wherein the one-turn regions are each constituted by one turn of the conductor.

4. The coil of claim 1, wherein at least a part of the one-turn region of the part of a one-turn region near a rotor is constituted of the first member.

5. The coil of claim 1, wherein:

the first half-turn region is a region on an upstream side in a rotation direction of the rotor; and the second half-turn region is a region on a downstream side in the rotation direction of the rotor.

6. The coil of claim 1, wherein the first member is a conductor having a higher resistance than that of the second member.

7. The coil of claim 1, wherein:

the first member is a metal composed primarily of aluminum; and the second member is a metal composed primarily of copper.

8. A stator to which the coil of claim 1 is attached.

9. A motor comprising the coil of claim 1.

\* \* \* \* \*